(12) United States Patent
Ganguly et al.

(10) Patent No.: US 11,711,179 B2
(45) Date of Patent: Jul. 25, 2023

(54) TESTING NETWORKED SYSTEM USING ABNORMAL NODE FAILURE

(71) Applicant: SAP SE, Walldorf (DE)

(72) Inventors: Subhodeep Ganguly, Bangalore (IN); Nagendra Reddy Devireddy, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/362,032

(22) Filed: Jun. 29, 2021

(65) Prior Publication Data
US 2022/0416960 A1     Dec. 29, 2022

(51) Int. Cl.
*H04L 1/24*          (2006.01)
*H04L 12/26*         (2006.01)
*H04L 43/06*         (2022.01)
*H04L 43/50*         (2022.01)
*H04L 43/0823*       (2022.01)

(52) U.S. Cl.
CPC .............. *H04L 1/241* (2013.01); *H04L 1/243* (2013.01); *H04L 1/244* (2013.01); *H04L 43/06* (2013.01); *H04L 43/0847* (2013.01); *H04L 43/50* (2013.01)

(58) Field of Classification Search
CPC ......... H04L 1/241; H04L 1/243; H04L 1/244; H04L 43/06; H04L 43/0847; H04L 43/50
See application file for complete search history.

(56) References Cited

U.S. PATENT DOCUMENTS

| | | | |
|---|---|---|---|
| 10,225,156 B2* | 3/2019 | Savio | H04L 41/145 |
| 10,423,390 B1* | 9/2019 | Mani | G06F 8/30 |
| 10,892,966 B2* | 1/2021 | Sanders | H04L 43/50 |
| 10,986,013 B1* | 4/2021 | Theimer | G06F 11/3466 |
| 11,049,058 B2* | 6/2021 | Aasoori | G06Q 10/06375 |
| 11,245,591 B1* | 2/2022 | Bar Oz | H04L 43/50 |
| 11,416,377 B2* | 8/2022 | Bromann | H04L 43/50 |
| 2017/0329696 A1* | 11/2017 | Bitoun | H04L 43/50 |
| 2020/0106691 A1* | 4/2020 | Koshelev | G06F 11/3664 |
| 2021/0135971 A1* | 5/2021 | Martin | H04L 41/145 |
| 2022/0095122 A1* | 3/2022 | Emani | H04W 16/22 |
| 2022/0141304 A1* | 5/2022 | Gefen | G06F 9/445 |
| | | | 709/219 |
| 2022/0210044 A1* | 6/2022 | Rao | H04L 41/0816 |

* cited by examiner

*Primary Examiner* — Schquita D Goodwin
(74) *Attorney, Agent, or Firm* — Schwegman Lundberg & Woessner, P.A.

(57) ABSTRACT

Techniques for testing a networked system using simulated abnormal node failure are disclosed. In some embodiments, a computer system performs operations comprising: repeatedly transmitting simulated requests to a networked system on which a software application is implemented using a plurality of nodes, the networked system being configured to respond to the simulated requests using the plurality of nodes; randomly selecting one or more nodes from the plurality of nodes; terminating the randomly selected one or more nodes; restarting the terminated randomly selected one or more nodes; repeating the randomly selecting one or more nodes, the terminating the randomly selected one or more nodes, and the restarting the terminated randomly selected one or more nodes until each one of the plurality of nodes has been terminated and restarted at least once during the first period of time; and determining response times of the networked system in responding to the simulated requests.

20 Claims, 10 Drawing Sheets

| SIMULATED REQUEST | RESPONSE TIME |
|---|---|
| S4_BUY_EVT_001_FORCELOGOUT | 24087 |
| S4_BUY_EVT_001_LOGIN_MAIN | 7784 |
| S4_T_BUT_PRJ_HOMETAB | 934 |
| S4_T_BUY_PRJ_CLICKSEARCH | 192 |
| . . . | . . . |

TESTING NETWORKED SYSTEM USING ABNORMAL NODE FAILURE

BACKGROUND

Networked systems, such as cloud computing systems, often suffer from system failure. Current solutions, such as load testing, only address predictable failures, thereby failing to test a networked system's ability to handle random abnormal failures. As a result, random abnormal failures continue to interrupt the functioning of networked systems. In addition to the issues discussed above, other technical problems may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 4 illustrates a table of example simulated requests and their corresponding response times.

DETAILED DESCRIPTION

Figure 1:
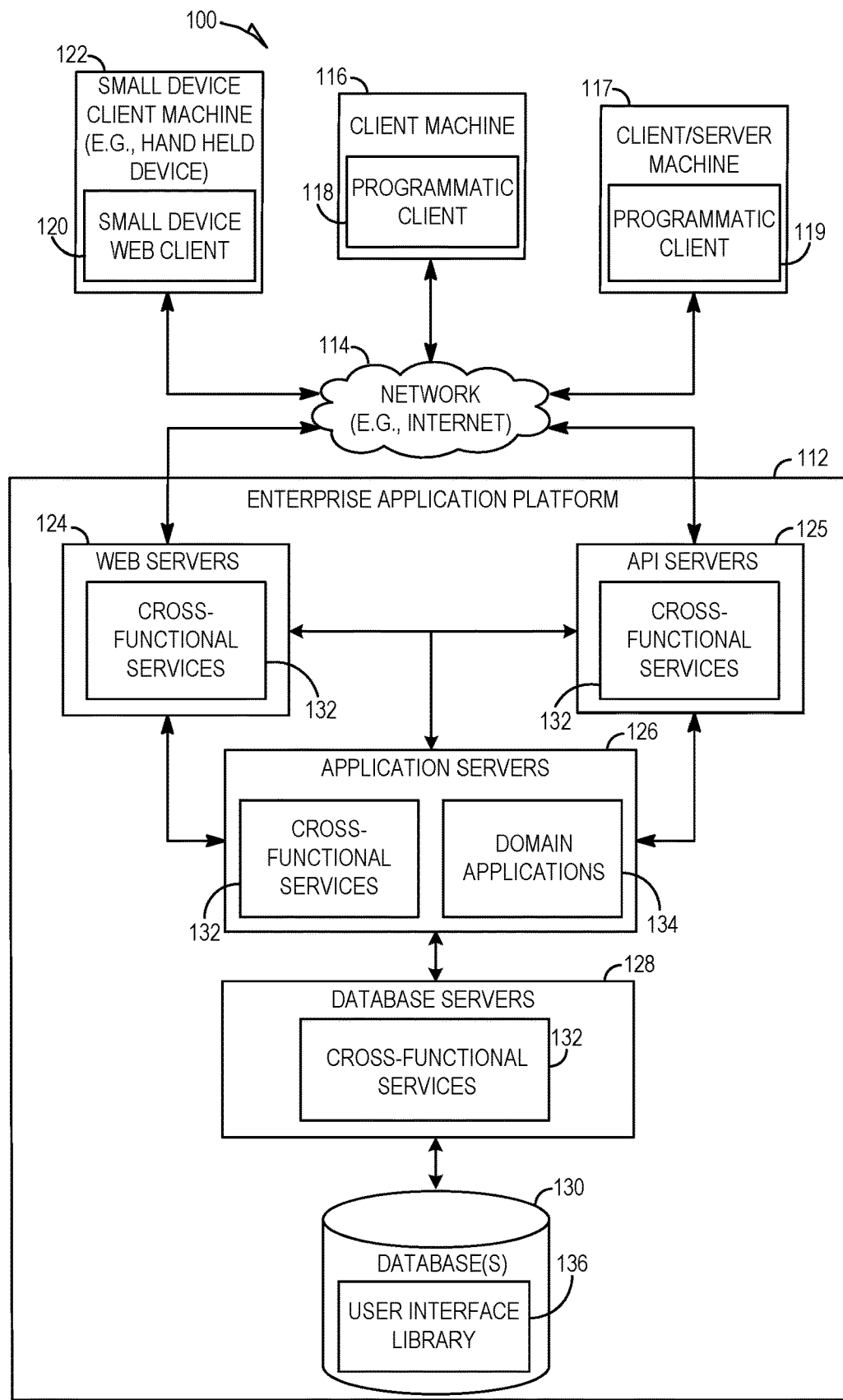
FIG. 1 is an example network diagram illustrating a system.

Example methods and systems for testing a networked system using simulated abnormal node failure are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to test a networked system using simulated abnormal node failure. In some example embodiments, the computer system repeatedly transmits simulated requests to a networked system on which a software application is implemented using a plurality of nodes, with the networked system being configured to respond to the simulated requests using the plurality of nodes. The computer system may randomly select one or more nodes from the plurality of nodes. In some example embodiments, during a period of time when the simulated requests are repeatedly being transmitted to the networked system, the computer system terminates the randomly selected one or more nodes, and then restarts the terminated randomly selected one or more nodes. The computer system may repeat the randomly selecting one or more nodes, the terminating the randomly selected one or more nodes, and the restarting the terminated randomly selected one or more nodes until each one of the plurality of nodes has been terminated and restarted at least once during the period of time.

In some example embodiments, for each one of the simulated requests transmitted during the period of time, the computer system may determine a corresponding response time of the networked system in responding to the simulated request, which may then be stored in a database and subsequently used in performing a function to address vulnerabilities of the networked system to random abnormal failures. As a result of the features disclosed herein, the resiliency and recoverability of the networked system is significantly improved, since the response of networked system to random abnormal failures is tested, resulting in resilience and recoverability data that can be analyzed to detect and resolve technical deficiencies. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is an example network diagram illustrating a system 100. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
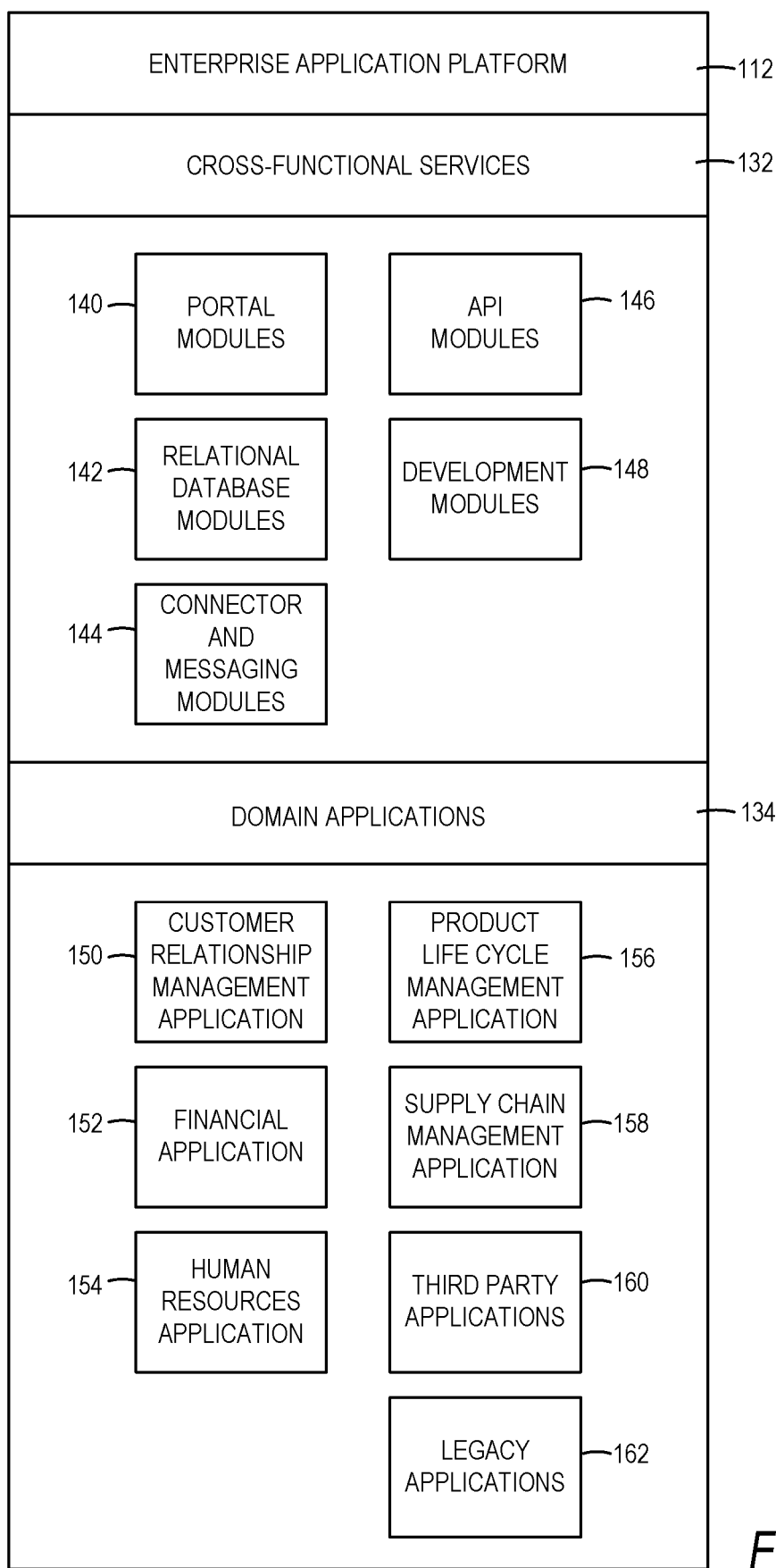
FIG. 2 is a block diagram illustrating example enterprise applications and services in an enterprise application platform.

FIG. 2 is a block diagram illustrating example enterprise applications and services in an enterprise application platform 112. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
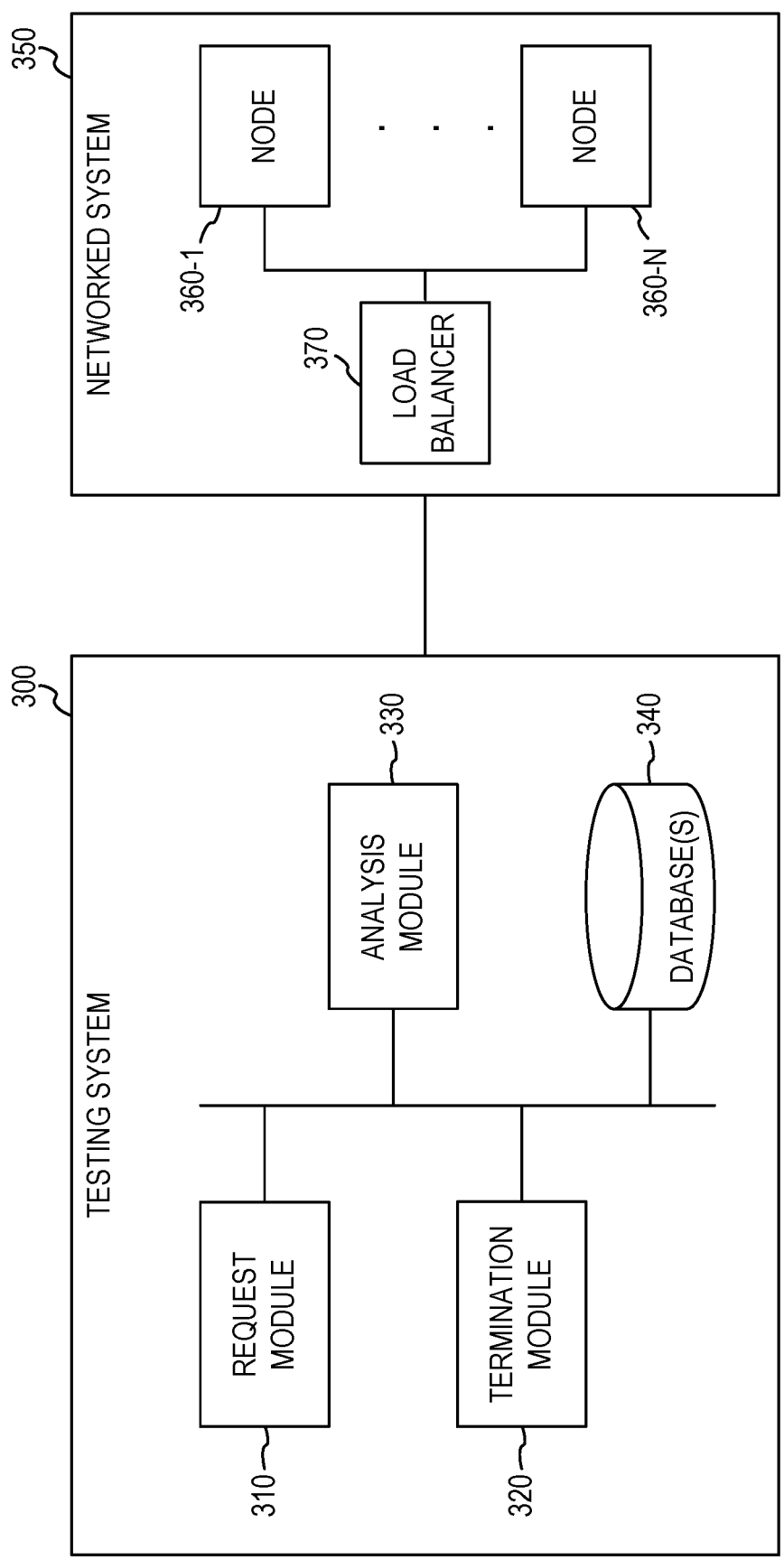
FIG. 3 is a block diagram illustrating an example testing system.

FIG. 3 is a block diagram illustrating an example testing system 300, in accordance with some example embodiments. In some embodiments, the testing system 300 comprises any combination of one or more of a request module 310, a termination module 320, an analysis module 330, and one or more database(s) 340. The request module 310, a termination module 320, an analysis module 330, and the database(s) 340 can reside on a computer system, or other machine, having a memory and at least one processor (not shown). In some embodiments, the request module 310, a termination module 320, an analysis module 330, and the database(s) 340 are incorporated into the enterprise application platform 112 in FIGS. 1 and 2. However, it is contemplated that other configurations of the request module 310, a termination module 320, an analysis module 330, and the database(s) 340 are also within the scope of the present disclosure.

In some example embodiments, one or more of the request module 310, the termination module 320, and the analysis module 330 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input. In some example embodiments, one or more of the request module 310, the termination module 320, and the analysis module 330 are configured to receive user input. For example, one or more of the request module 310, the termination module 320, and the analysis module 330, can present one or more graphical user interface (GUI) elements (e.g., drop-down menu, selectable buttons, text field) with which a user can submit input. In some example embodiments, one or more of the request module 310, the termination module 320, and the analysis module 330 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the testing system 300 is communicatively coupled to a networked system 350. For example, the testing system 300 may communicate with the networked system 350 via a network (e.g., via the network 114 in FIG. 1). The networked system 350 may comprise any computer system that is configured to respond to requests transmitted to it via a network connection. In some example embodiments, a software application is implemented on the networked system 350 using a plurality of nodes 360 (e.g., NODE 360-1, . . . , NODE 360-N in FIG. 3, where N is an integer greater than 1). For example, the plurality of nodes 360 may be used by the networked system 350 to implement the enterprise application platform 112 of FIGS. 1 and 2. In some example embodiments, the networked system 350 comprises a load balancer 370 that distributes a set of tasks over the plurality of nodes 360 with the aim of making their overall processing more efficient. Each node 360 may comprise any physical or virtual computing component that is capable of processing and responding to a request.

The networked system 350 may comprise a microservices architecture on which one or more software applications are implemented using the plurality of nodes 360. A microservices architecture is a variant of the service-oriented architecture (SOA) structural style that arranges a software application as a collection of loosely coupled services. In a microservices architecture, services are fine-grained and the protocols are lightweight.

In some example embodiments, the request module 310 is configured to repeatedly transmit simulated requests to a networked system 350 during a first period of time. For example, the request module 310 may continuously transmit requests for a specific amount of time, with an interval amount of time between each transmission. In some example embodiments, the request module 310 comprises a controller node (not shown) and multiple worker nodes (not shown). The controller node may provide instructions to the worker nodes on transmitting the simulated requests to the networked system 350, and the worker nodes may transmit the simulated requests to the networked system 350 based on the instructions provided by the controller node.

In some example embodiments, a user may configure a test plan to be used by the request module 310 in transmitting the simulated requests to the networked system 350. For example, the testing system 300 may provide graphical user interface elements with which the user can interact with via a computing device on which the graphical user interface elements are displayed, thereby enabling the user to configure the test plan via the graphical user interface elements, such as by entering or selecting test configuration options. Examples of test configuration options for the test plan that may be configured by the user include, but are not limited to, a length of the period of time for the repeated transmission of simulated requests (e.g., repeatedly transmit simulated requests for 2 hours), a total number of simulated requests to transmit during the period of time, a ramp-up/ramp-down schedule for increasing and/or decreasing the number of simulated requests to transmit during the period of time, an interval amount of time between each transmission, one or more types of request to be used in the simulated requests, a number of worker nodes to be used in transmitting the simulated requests, and a number of threads to be used in transmitting the simulated requests. Other types of test configuration options for the test plan are also within the scope of the present disclosure.

In some example embodiments, each request transmitted by the request module 310 comprises a transaction, and the networked system 350 implements transaction processing. Transaction processing is information processing that is divided into individual, indivisible operations called transactions, where each transaction must succeed or fail as a complete unit, as opposed to being only partially complete. In addition to or as an alternative to transactions and transaction processing, the request module 310 may transmit other types of requests and the networked system 350 may implement other types of processing. In some example embodiments, the requests may comprise requests for the performance of functions of one or more enterprise applications or services, such as any function discussed above with respect to the enterprise application platform 112 (e.g., the cross-functional services 132, the domain applications 134 in FIGS. 1 and 2).

In some example embodiments, the termination module 320 is configured to randomly select one or more nodes 360 from the plurality of nodes 360. The termination module 320 may use a random number generator to randomly select the node(s) 360. In some example embodiments, during a first period of time, such as a period of time defined by the test plan, the termination module 320 terminates the randomly selected node(s) 360, and then restarts the terminated randomly selected node(s) 360. The termination module 720 may terminate the randomly selected node(s) 360 by communicating one or more instructions to the networked system 350 to terminate (e.g., shut down) the randomly selected node(s) 360. For example, the termination module 720 may transmit the instruction(s) to terminate the randomly selected node(s) 360 to a cluster controller on the networked system 350. The cluster controller may comprise any component configured to control the plurality of nodes 360. The cluster controller may terminate the randomly selected node(s) 360 in response to receiving the instruction(s) from the termination module 320. Other ways of terminating the randomly selected node(s) 360 are also within the scope of the present disclosure.

Similarly, the termination module 720 may restart the randomly selected node(s) 360 by communicating one or more instructions to the networked system 350 to restart the randomly selected node(s) 360 that has been shut down. For example, the termination module 720 may transmit the instruction(s) to restart the randomly selected node(s) 360 to a cluster controller on the networked system 350. The cluster controller may restart the randomly selected node(s) 360 in response to receiving the instruction(s) from the termination module 320. Alternatively, the networked system 350 may automatically restart terminated nodes 360 as part of a predefined logic configured for handling failure events. Other ways of restarting the randomly selected node(s) 360 are also within the scope of the present disclosure.

The termination module 320 may repeat the terminating and restarting of randomly selected nodes 360 until each one of the plurality of nodes 360 has been terminated and restarted at least once during the period of time. In some example embodiments, the termination module 320 performs the random selection of the nodes 360 in real-time for each iteration of the terminating and restarting cycle. Alternatively, the termination module 320 may determine the random selection of the nodes 360 for each iteration of the terminating and restarting cycle ahead of time, such as by performing the random selection of the nodes 360 for a massive amount of iterations of the terminating and restarting cycle prior to the first termination, and then storing the sequence of random selections for subsequent use during the performance of the terminating and restarting cycle. For example, the termination module 320 may first perform one-thousand iterations of node selection (e.g., nodes 1 and 3 randomly selected in the first iteration, nodes 2 and 14 randomly selected in the second iteration, nodes 2 and 41 randomly selected in the third iteration, . . . , nodes 8 and 37 randomly selected in the one-thousandth iteration), store a record of the one-thousand sets of node selections, and then use the stored node selections in order during the iterations of the terminating and restarting cycles.

Each repeated iteration of the terminating and restarting operations, as well as each iteration of the random selection operation (if the random selection operation is performed in real-time as part of the cycle rather than being performed ahead of time prior to the start of the cycle), may be performed immediately after the previous iteration of these operations in response to the completion of the previous iteration of these operations. Alternatively, the termination module 320 may wait an interval amount of time, such as a few seconds, between performing each repeated iteration of these operations. The interval amount of time between each repeated iteration may be uniform for each repeated iteration. Alternatively, the interval amount of time between each repeated iteration may be randomly determined using a random number generator in order to provide additional unpredictability to the simulated node terminations, thereby improving the simulation of abnormal failure.

The number of times the terminating and restarting operations are repeated may depend on the total number of nodes 360 in the plurality of nodes 360, as well as on the way in which the nodes 360 are randomly selected by the termination module 320. In example embodiments in which the termination module 320 is configured to randomly select one node 360 for each iteration, use a list of the plurality of nodes 360 from which the nodes 360 are randomly selected, and remove nodes 360 from the list when the nodes 360 are randomly selected, the number of times that the terminating and restarting operations are repeated is equal to the total number of nodes 360 in the plurality of nodes 360. For example, if the total number of nodes 360 in the plurality of nodes 360 is ten, and the termination module 320 randomly selects and removes one node 360 from the list of the plurality of nodes 360, then the terminating and restarting operations may be performed ten times. Alternatively, in example embodiments in which the termination module 320 keeps the nodes 360 that have been randomly selected in the list and available for subsequent random selection, the termination module 320 may randomly select the same node 360 from the plurality of nodes 360 more than once (e.g., nodes 1 and 3 randomly selected in the first iteration, nodes 2 and 3 randomly selected in the second iteration, nodes 2 and 41 randomly selected in the third iteration, etc.), thereby making the number of times that the terminating and restarting operations are repeated unpredictable. As a result of the termination module 320 being configured to potentially select the same node 360 from the plurality of nodes 360 more than once, the termination module 320 provides additional unpredictability to the simulated node terminations, thereby improving the simulation of abnormal failure.

In some example embodiments, the termination module 320 is configured to randomly select fewer than the total number of nodes 360 in the plurality of nodes 360. For example, in a scenario where the total number of nodes 360 in the plurality of nodes is ten, the termination module 320 limit the number of nodes 360 that are randomly selected for each iteration to nine, thereby ensuring that at least one node 360 in the plurality of nodes 360 is available for use without interruption.

In some example embodiments, the analysis module 330 is configured to determine a corresponding response time of the networked system 350 in responding to each one of the simulated requests transmitted during the period of time. For example, in determining a corresponding response time for a simulated request, the analysis module 330 may determine a time at which the simulated request was transmitted from the testing system 300 to the networked system 350, which may be set and stored (e.g., in the database(s) 340) by the request module 310 when the simulated request is transmitted and retrieved by the analysis module 330, and also determine a time at which one of the nodes 360 of the networked system 350 responds to the simulated request, which may be determined from metadata of a message sent by the networked system 350 as a response to the simulated request. The analysis module 330 may then calculate the response time for the simulated request based on the difference between the time at which the simulated request was transmitted and the time at which the node 360 responded to the simulated request. Other ways of determining the response time for each simulated request are also within the scope of the present disclosure.

The analysis module 330 may store the corresponding response times for the simulated requests in the database(s) 340. For example, each response time may be stored in the database(s) 340 in association with an identification of the corresponding simulated request. FIG. 4 illustrates a table 400 of example simulated requests and their corresponding response times. In some example embodiments, the corresponding response times are stored in a time series database. However, other types of databases may be used as well.

The testing system 300 may perform the above-discussed testing operations over multiple different periods of time, using a different test plan for each different period of time. For example, the testing system 300 may increase the number of nodes that are randomly selected, terminated, and restarted after each period of time, starting with randomly selecting only one node for every iteration used during a first period of time, then randomly selecting two nodes for every iteration used during a second period of time after the first period of time, and then randomly selecting three nodes for every iteration used during a third period of time after the second period of time, and so on and so forth until a specified maximum number of nodes are randomly selected for every iteration of a period of time. The testing system 300 may implement other differences between different testing periods of time as well, including but not limited to, different durations of time periods, different numbers of simulated requests transmitted, different types of simulated requests transmitted, and different intervals or frequencies used for transmission of simulated requests.

In some example embodiments, the analysis module 330 is configured to perform a function using at least a portion of the corresponding response times for the simulated requests. The function comprises causing at least a portion of the corresponding response times for the simulated requests to be displayed on a computing device, such as on the client machine 116, the small device client machine 122, or the client/server machine 117 in FIG. 1. The response times may be displayed in response to user input, such as in response to a user of the computing device selecting one or more user interface elements configured to trigger the display of the response times.

Figure 5:
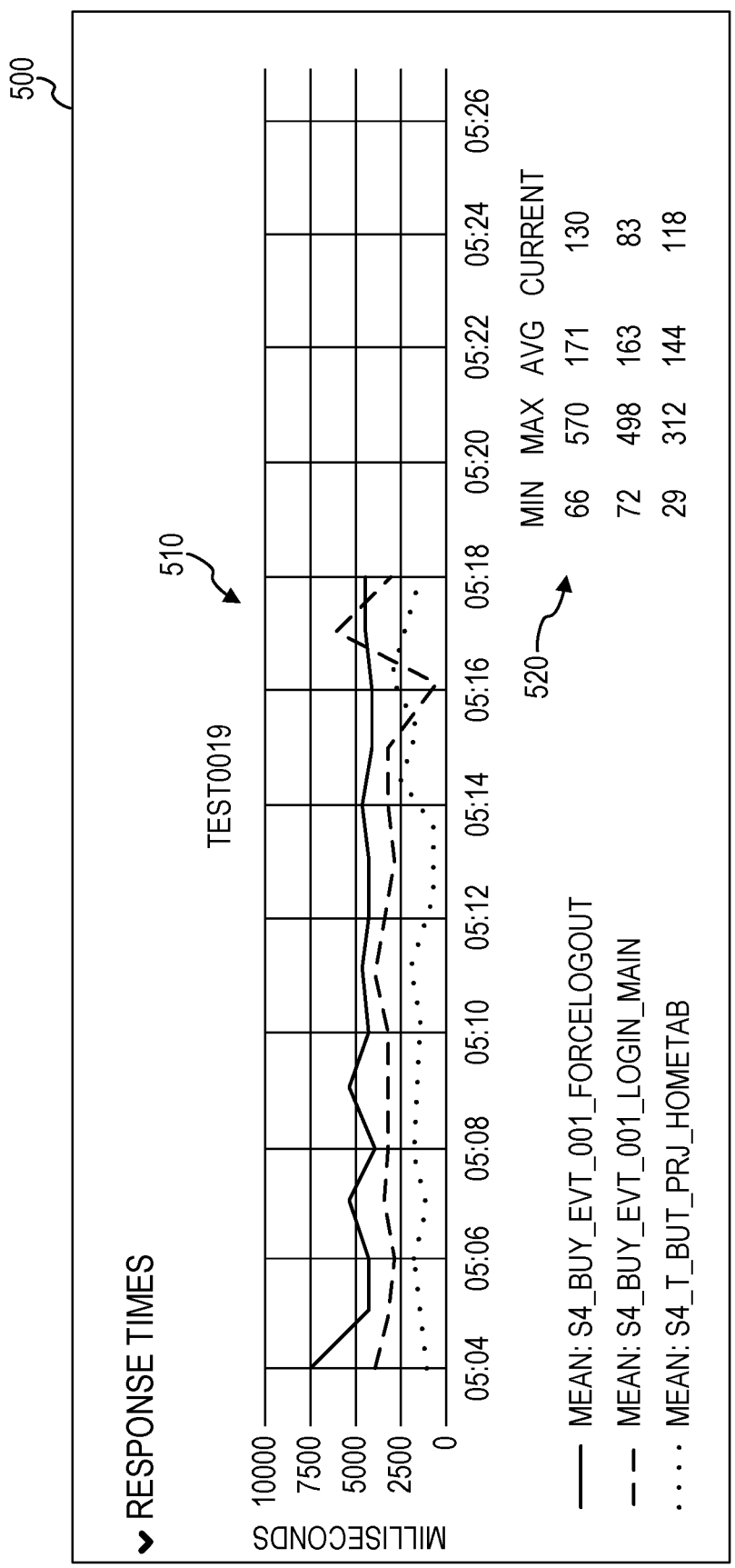
FIG. 5 illustrates an example graphical user interface (GUI) in which response times of simulated requests are displayed.

FIG. 5 illustrates an example graphical user interface (GUI) 500 in which response times of simulated requests are displayed, in accordance with some example embodiments. In the GUI 500, the response times are displayed as part of a time series graph 510, such as a line graph of repeated measurements taken over regular time intervals. The GUI 500 also displays statistics 520 of the response times for each simulated request, such as a minimum response time, a maximum response time, an average response time, and a current response time. Other data or visualizations based on the response times may also be displayed.

Figure 6:
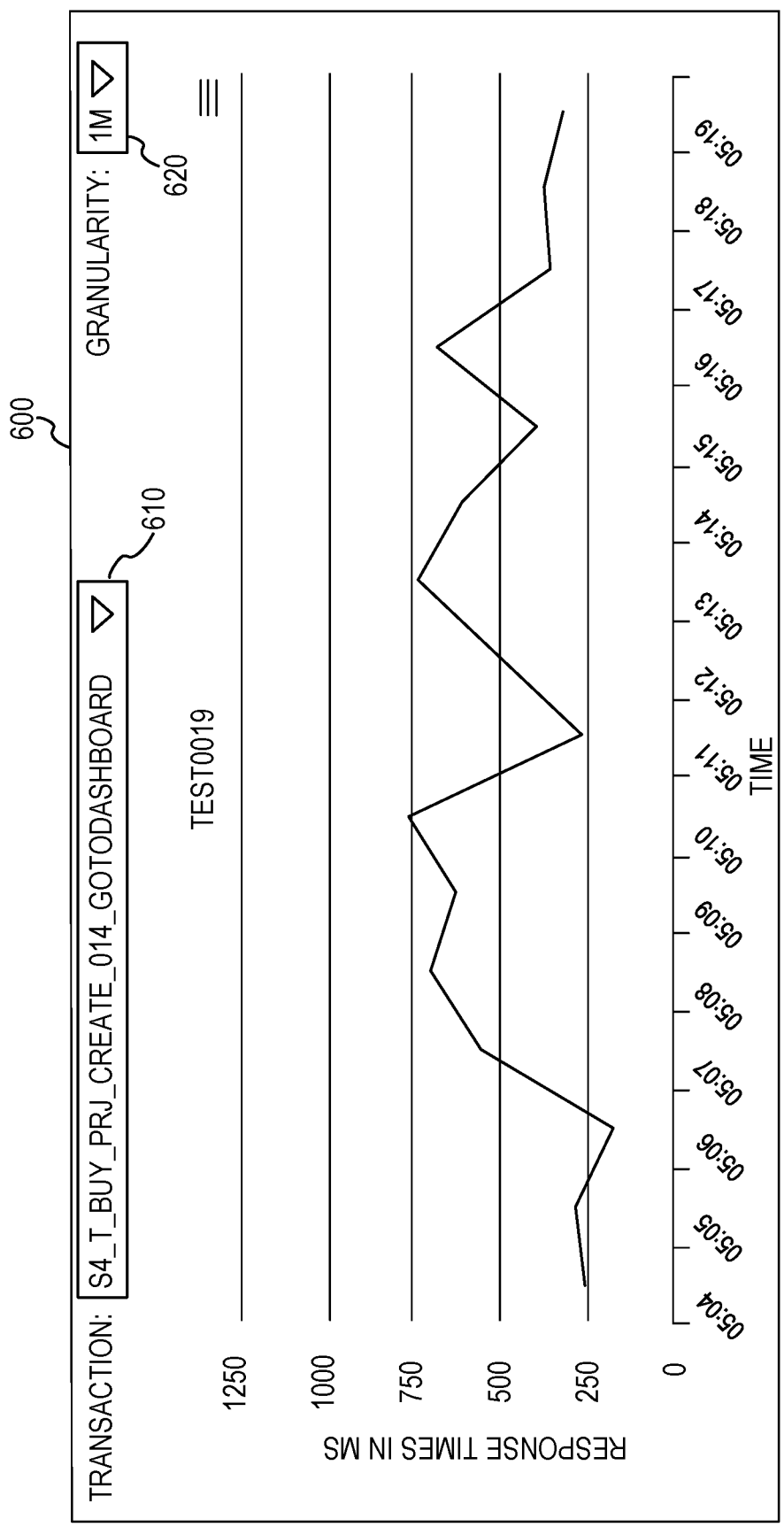
FIG. 6 illustrates another example GUI in which response times of simulated requests are displayed.

FIG. 6 illustrates another example GUI 600 in which response times of simulated requests are displayed. Similar to the GUI 500, in the GUI 600, the response times are displayed as part of a time series graph. Additionally, in the GUI 600, selectable user interface elements 610 and 620 are displayed to enable the user to configure the details of the display. For example, the user may use the selectable user interface element 610 to select a specific simulated request for which to display the corresponding response times, and the user may use the selectable user interface element 620 to select at what granularity in terms of time for the X-axis of the time series graph to display the corresponding response times.

In some example embodiments, the function performed by the analysis module 330 comprises analyzing at least a portion of the response times, and then generating a recommendation for modifying the networked system 350 based on the analysis. For example, the analysis module 330 may input the response times and their corresponding attributes (e.g., type of simulated requests to which the response times correspond, nodes 360 to which the simulated requests were transmitted, timing of transmission of simulated requests) into a model to generate the recommendation for modifying the networked system 350. The recommendation may include, but is not limited to, a modification to the architecture of the networked system 350, a removal of specific nodes 360 from being used in servicing certain requests, an addition of a specific number of nodes 360 to be used in servicing certain requests, and a change of code being executed on the networked system 350. Other types of recommendations may be generated and recommended by the analysis module 330 as well.

In some example embodiments, the model used by the analysis module 330 to generate a recommendation for modifying the networked system 350 may be configured to determine the type of recommendation based on the response times and their corresponding attributes. For example, the model may be configured to identify the requests for which the corresponding response times are above a predetermined threshold response time (e.g., a response time above which is identified as being a response failure) as corresponding to a response failure, and then, use those identified requests corresponding to a response failure to determine whether the networked system 350 has a capacity problem or a code problem based on whether the identified requests include multiple types of requests above a threshold number of types of requests. In one example, the model may determine that the networked system 350 has a capacity problem in response to a determination that the identified requests include multiple types of requests above a threshold number of types of requests (e.g., when the networked system 350 experienced a response failure for all types of requests), and the model may determine that the networked system 350 has a code problem in response to a determination that the identified requests do not include above a threshold number of types of requests (e.g., when the networked system 350 experience a response failure for only one particular type of request, but responded within a sufficient amount of time for other types of requests). The model may be configured to recommend the addition of nodes 360 in response to a determination that the networked system 350 has a capacity problem.

The model may also be configured to recommend a change of code executed on the networked system 350 in response to a determination that the networked system 350 has a code problem. In some example embodiments, the model comprises a machine-learned model that is trained to find patterns in the code associated with the failed responses to the identified requests. For example, the machine-learned model may be trained using training data that includes examples of code that are each labeled as examples of a code problem. The example of code may also be labeled with an indication of a specific type of problem, such as the length of the code being too long. The trained machine-learned model may then be applied to the code associated with the failed responses to the identified requests (e.g., the code of the nodes 360 that were tasked with processing the identified requests) to generate an output that identifies whether or not the code is the cause of response failure. The trained machine-learned model may generate an output that identifies the specific type of problem with the code, such as the length of the code being too long, as previously discussed.

In some example embodiments, the generated recommendation is displayed on the computing device of the user. Additionally or alternatively, the analysis module 330 may automatically modify the networked system 350 based on the analysis of the response times. For example, the analysis module 330 may determine whether a trigger condition has been satisfied by the response times, and then perform the recommended modification based on a determination that the trigger condition has been satisfied. One example of a trigger condition comprises a measure of the response times exceeding a threshold value (e.g., if the average response time exceeds a threshold response time value). Other types of trigger conditions are also within the scope of the present disclosure.

Although the testing system 300 is illustrated in FIG. 3 as being external to the networked system 350, in some example embodiments, one or more components of the testing system 300 may be partially or fully implemented on the networked system 350. For example, the testing system 300 may deploy the request module 310 and the termination module 320 as agents onto each one of the plurality of nodes 360. Other configurations of the components of the testing system 300 are also within the scope of the present disclosure.

Figure 7:
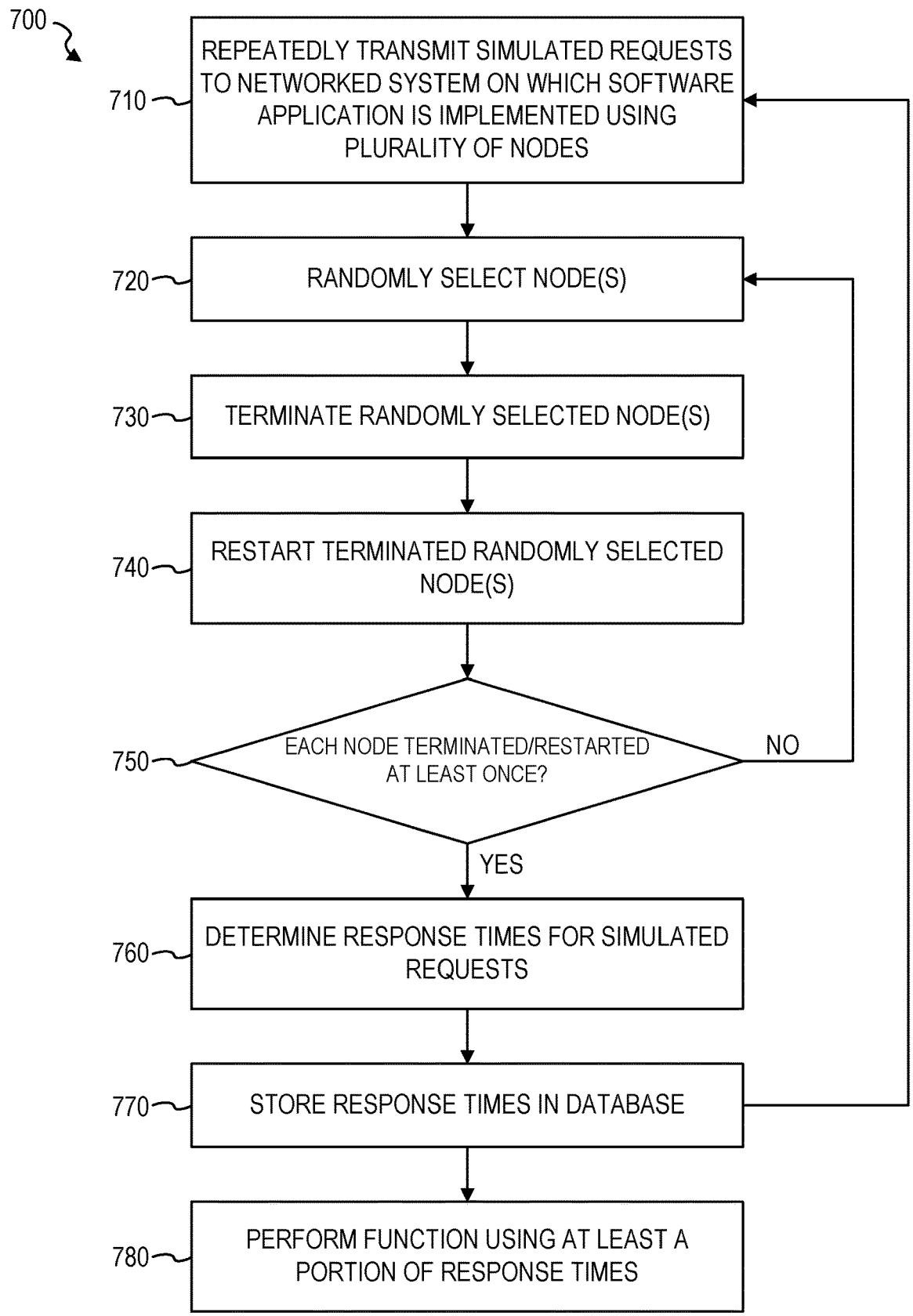
FIG. 7 is a flowchart illustrating an example method of testing a networked system using simulated abnormal node failure.

FIG. 7 is a flowchart 700 illustrating an example method of testing a networked system using simulated abnormal node failure. The method 700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 700 are performed by the testing system 300 of FIG. 3 or any combination of one or more of its components (e.g., the request module 310, the termination module 320, the analysis module 330).

At operation 710, the testing system 300, during a first period of time, repeatedly transmits simulated requests to the networked system 350 on which a software application is implemented using the plurality of nodes 360. The networked system 350 may be configured to respond to the simulated requests using the plurality of nodes 360. The software application may be implemented on a microservices architecture of the networked system 350. However, other implementations of the software application are also within the scope of the present disclosure.

The testing system 300 may randomly select one or more nodes 360 from the plurality of nodes 360, at operation 720. In some example embodiments, the testing system 300 may randomly select the node(s) 360 during the first period of time. Alternatively. the testing system 300 may randomly select the node(s) 360 prior to the first period of time. In some example embodiments, for each random selection of one or more nodes 360 during the first period of time, a total number of the randomly selected one or more nodes 360 is less than a total number of the plurality of nodes 360.

Next, at operation 730, the testing system 300 may terminate the randomly selected node(s) 360. The testing system 730 may terminate the randomly selected node(s) 360 by communicating one or more instructions to the networked system 350 to terminate (e.g., shut down) the randomly selected node(s) 360. Other ways of terminating the randomly selected node(s) 360 are also within the scope of the present disclosure.

Subsequently, the testing system 300 may restart the terminated randomly selected node(s) 360, at operation 740. The termination module 720 may restart the randomly selected node(s) 360 by communicating one or more instructions to the networked system 350 to restart the randomly selected node(s) 360 that has been shut down. The networked system 350 may automatically restart terminated nodes 360 as part of a predefined logic configured for handling failure events. Other ways of restarting the randomly selected node(s) 360 may also be employed by the testing system 300.

At operation 750, the testing system 300 determines whether each one of the plurality of nodes 360 has been terminated and restarted at least once during the first period of time (e.g., during the repeated transmission of the simulated requests). If the testing system 300 determines that not all of the plurality of nodes 360 have been terminated and restarted at least once during the first period of time, then the method 700 returns to operation 720, where the testing system 300 repeats another iteration of randomly selecting one or more node(s) 360.

If the testing system 300 determines, at operation 750, that each one of the plurality of nodes 360 has been terminated and restarted at least once during the first period of time, then the testing system 300 may proceed to determining, for each one of the simulated requests transmitted during the first period of time, a corresponding response time of the networked system 350 in responding to the simulated request, at operation 760, and then storing the corresponding response times for the simulated requests in the database(s) 340, at operation 770. In some example embodiments, the method may return to operation 710 to repeatedly transmit simulated requests to the networked system 350 during a another period of time subsequent to the first period of time according to a different test plan than used in the previous iteration(s) of operation 710 during the previous period(s) of time or a different part of the same test plan, and then proceed operations 720 to 770 based on the repeated transmission of simulated requests during the new recent period of time.

At operation 780, the testing system 300 may perform a function using at least a portion of the corresponding response times for the simulated requests. In some example embodiments, the function comprises causing the portion of the corresponding response times for the simulated requests to be displayed on a computing device. For example, the testing system 300 may display the response times using the GUI 500 of FIG. 5 or the GUI 600 of FIG. 6. Other functions are also within the scope of the present disclosure.

It is contemplated that any of the other features described within the present disclosure can be incorporated into the method 700.

Figure 8:
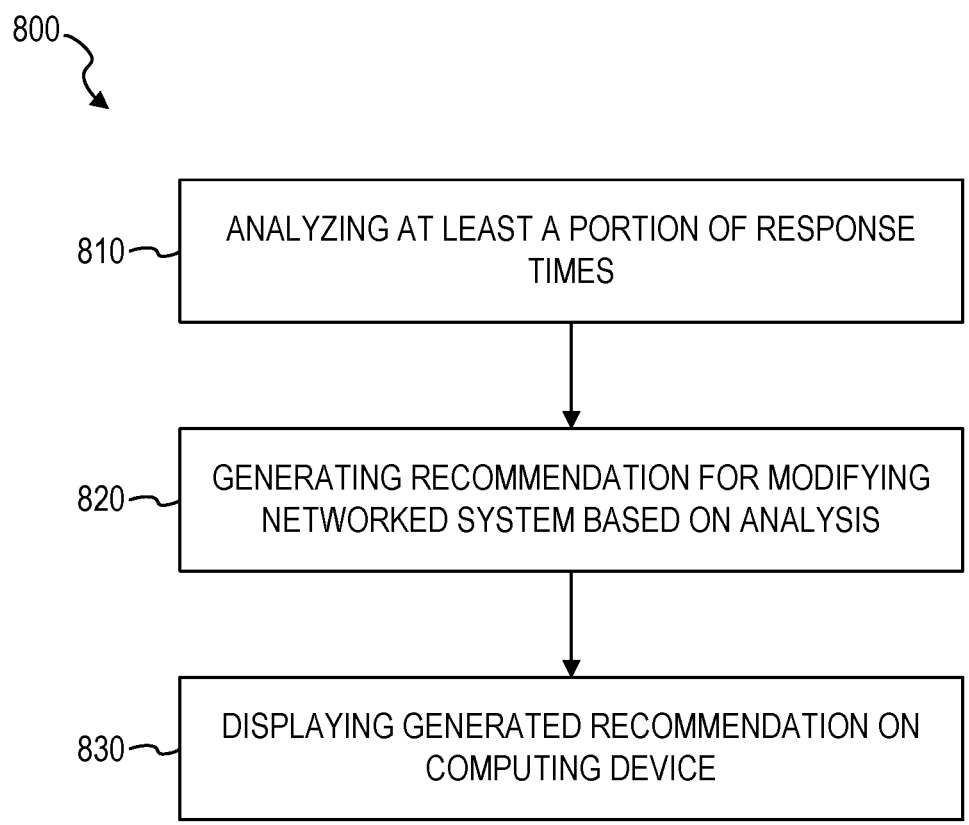
FIG. 8 is a flowchart illustrating an example method of performing a function using response times for simulated requests.

FIG. 8 is a flowchart illustrating an example method 800 of performing a function using response times for simulated requests. The method 800 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 800 are performed by the testing system 300 of FIG. 3 or any combination of one or more of its components (e.g., the request module 310, the termination module 320, the analysis module 330).

At operation 810, the testing system 300 analyzes the portion of the corresponding response times. Next, the testing system 300 may generate a recommendation for modifying the networked system 350 based on the analysis of the response times, at operation 820. For example, the testing system 300 may use any of the features discussed above with respect to the analysis module 330 to analyze the response times and generate the recommendation for modifying the networked system 350. Then, at operation 830, the testing system 300 may cause the generated recommendation to be displayed on a computing device.

It is contemplated that any of the other features described within the present disclosure can be incorporated into the method 800.

Figure 9:
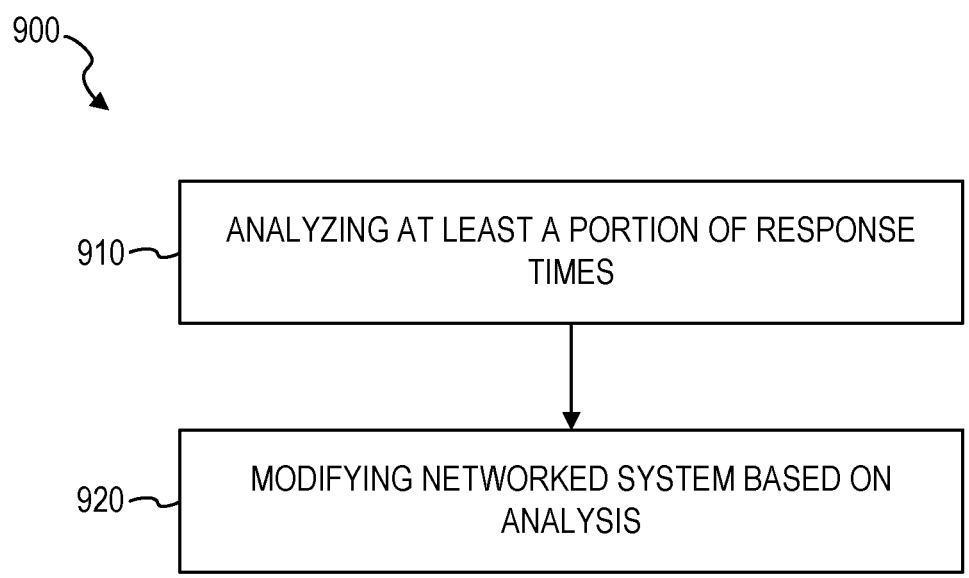
FIG. 9 is a flowchart illustrating another example method of performing a function using response times for simulated request.

FIG. 9 is a flowchart illustrating another example method 900 of performing a function using response times for simulated request. The method 900 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 900 are performed by the testing system 300 of FIG. 3 or any combination of one or more of its components (e.g., the request module 310, the termination module 320, the analysis module 330).

At operation 910, the testing system 300 analyzes the response times. Then, the testing system 300 may modify the networked system 350 based on the analysis of the response times, at operation 920. For example, the testing system 300 may use any of the features discussed above with respect to the analysis module 330 to analyze the response times and modify the networked system 350.

It is contemplated that any of the other features described within the present disclosure can be incorporated into the method 900.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: during a first period of time, repeatedly transmitting simulated requests to a networked system on which a software application is implemented using a plurality of nodes, the networked system being configured to respond to the simulated requests using the plurality of nodes; during the first period of time: randomly selecting one or more nodes from the plurality of nodes; terminating the randomly selected one or more nodes; restarting the terminated randomly selected one or more nodes; and repeating the randomly selecting one or more nodes, the terminating the randomly selected one or more nodes, and the restarting the terminated randomly selected one or more nodes until each one of the plurality of nodes has been terminated and restarted at least once during the first period of time; for each one of the simulated requests transmitted during the first period of time, determining a corresponding response time of the networked system in responding to the simulated request; storing the corresponding response times for the simulated requests in a database; and performing a function using at least a portion of the corresponding response times for the simulated requests.

Example 2 includes the computer-implemented method of example 1, wherein the software application is implemented on a microservices architecture of the networked system.

Example 3 includes the computer-implemented method of example 1 or example 2, wherein for each random selection of one or more nodes during the first period of time, a total number of the one or more nodes is less than a total number of the plurality of nodes.

Example 4 includes the computer-implemented method of any one of examples 1 to 3, further comprising: during a second period of time after the first period of time, repeatedly transmitting additional simulated requests to the networked system, the networked system being configured to respond to the additional simulated requests using the plurality of nodes; during the second period of time: randomly selecting one or more nodes from the plurality of nodes; terminating the randomly selected one or more nodes; restarting the terminated randomly selected one or more nodes; and repeating the randomly selecting one or more nodes, the terminating the randomly selected one or more nodes, and the restarting the terminated randomly selected one or more nodes until each one of the plurality of nodes has been terminated and restarted at least once during the second period of time; for each one of the additional simulated requests transmitted during the second period of time, determining a corresponding response time of the networked system in responding to the additional simulated request; and storing the corresponding response times for the additional simulated requests in the database, wherein for each random selection of one or more nodes during the first period of time, a total number of the one or more nodes randomly selected is a first number, wherein for each random selection of one or more nodes during the second period of time, a total number of the one or more nodes randomly selected is a second number that is greater than the first number, and wherein the function is performed using the corresponding response times for the simulated requests transmitted during the first period of time and the corresponding response times for the additional simulated requests transmitted during the second period of time.

Example 5 includes the computer-implemented method of any one of examples 1 to 4, wherein the function comprises causing the at least a portion of the corresponding response times for the simulated requests to be displayed on a computing device.

Example 6 includes the computer-implemented method of any one of examples 1 to 5, wherein the function comprises: analyzing the at least a portion of the corresponding response times; generating a recommendation for modifying the networked system based on the analyzing the at least a portion of the corresponding response times; and causing the generated recommendation to be displayed on a computing device.

Example 7 includes the computer-implemented method of any one of examples 1 to 6, wherein the function comprises: analyzing the at least a portion of the corresponding response times; and modifying the networked system based on the analyzing the at least a portion of the corresponding response times.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 10:
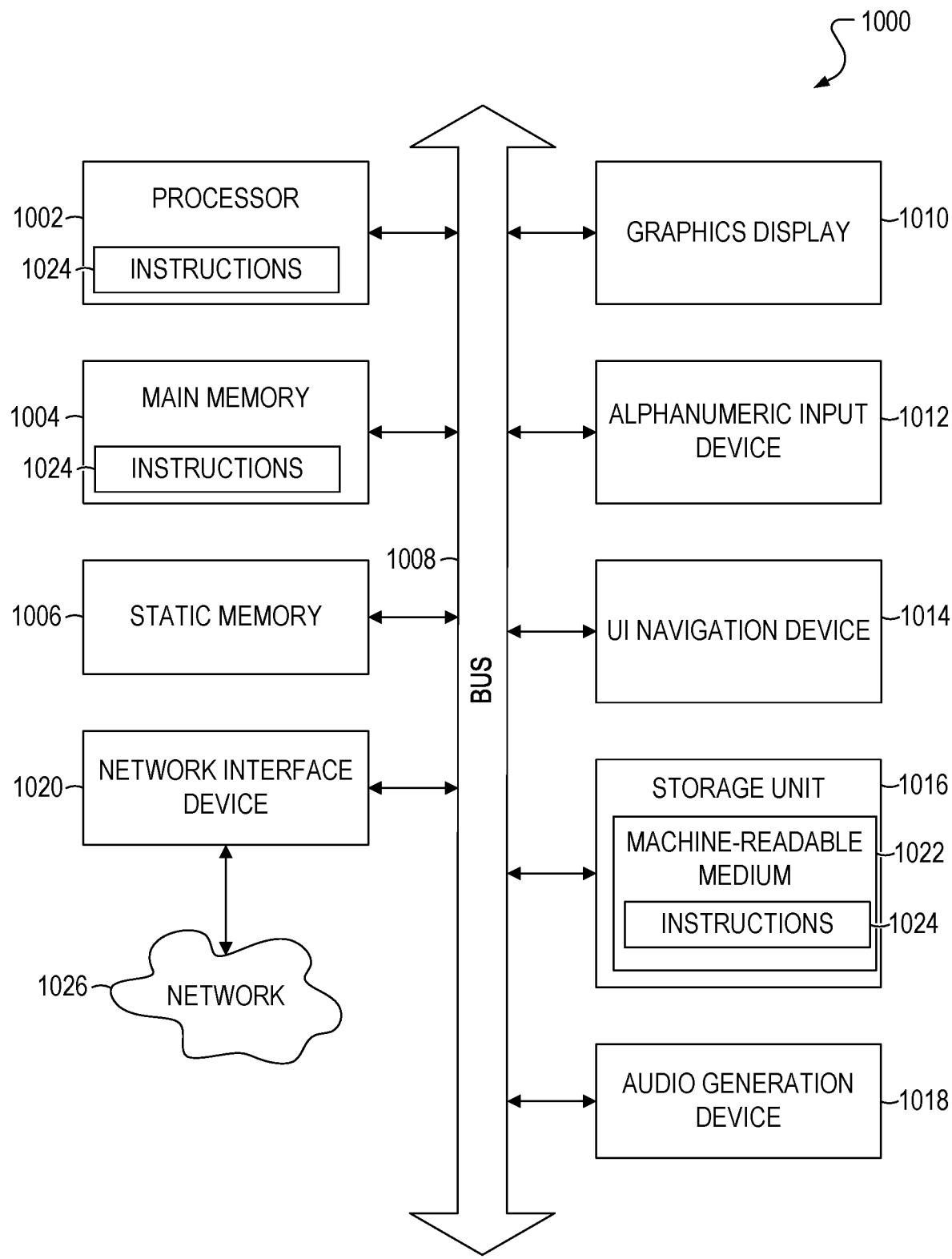
FIG. 10 is a block diagram of an example computer system on which methodologies described herein can be executed.

FIG. 10 is a block diagram of a machine in the example form of a computer system 1000 within which instructions 1024 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004, and a static memory 1006, which communicate with each other via a bus 1008. The computer system 1000 may further include a graphics or video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a storage unit (e.g., a disk drive unit) 1016, an audio or signal generation device 1018 (e.g., a speaker), and a network interface device 1020.

The storage unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method performed by a computer system having a memory and at least one hardware processor, the computer-implemented method comprising:
    during a first period of time, repeatedly transmitting simulated requests to a networked system on which a software application is implemented using a plurality of nodes, the networked system being configured to respond to the simulated requests using the plurality of nodes;
    during the first period of time, terminating and restarting one or more nodes randomly selected until each one of the plurality of nodes in the plurality of nodes has been terminated and restarted at least once during the first period of time;
    for each one of the simulated requests transmitted during the first period of time, determining a corresponding response time of the networked system in responding to the simulated request, the corresponding response time comprising an amount of time between a first time at which the simulated request was transmitted to the networked system and a second time at which the networked system responded to the simulated request;
    storing the corresponding response times for the simulated requests in a database; and
    performing a function using at least a portion of the corresponding response times for the simulated requests, the function comprising:
        identifying the simulated requests for which the corresponding response times are above a threshold response time;
        determining whether the identified simulated requests include multiple types of requests above a threshold number of types of requests;
        determining a type of problem affecting the networked system based on the determining of whether the identified simulated requests include multiple types of requests above the threshold number of types of requests;
        generating a recommendation for modifying the networked system based on the determining of the type of problem affecting the networked system; and
        causing the generated recommendation to be displayed on a computing device.

2. The computer-implemented method of claim 1, wherein the software application is implemented on a microservices architecture of the networked system.

3. The computer-implemented method of claim 1, wherein for each random selection of one or more nodes during the first period of time, a total number of the one or more nodes is less than a total number of the plurality of nodes.

4. The computer-implemented method of claim 1, further comprising:
    during a second period of time after the first period of time, repeatedly transmitting additional simulated requests to the networked system, the networked system being configured to respond to the additional simulated requests using the plurality of nodes;
    during the second period of time, terminating and restarting one or more nodes randomly selected until each one of the plurality of nodes in the plurality of nodes has been terminated and restarted at least once during the second period of time;
    for each one of the additional simulated requests transmitted during the second period of time, determining a corresponding response time of the networked system in responding to the additional simulated request; and
    storing the corresponding response times for the additional simulated requests in the database,
    wherein for each random selection of one or more nodes during the first period of time, a total number of the one or more nodes randomly selected is a first number,
    wherein for each random selection of one or more nodes during the second period of time, a total number of the one or more nodes randomly selected is a second number that is greater than the first number, and
    wherein the function is performed using the corresponding response times for the simulated requests transmitted during the first period of time and the corresponding response times for the additional simulated requests transmitted during the second period of time.

5. The computer-implemented method of claim 1, wherein the function further comprises causing the at least a portion of the corresponding response times for the simulated requests to be displayed on a computing device.

6. The computer-implemented method of claim 1, wherein the determining of the type of problem comprises determining whether the type of problem is a capacity problem or a code problem.

7. The computer-implemented method of claim 6, wherein the determining whether the type of problem is a capacity problem or a code problem comprises:
   determining that the type of problem is a capacity problem based on a determination that the identified simulated requests include multiple types of requests above the threshold number of types of requests; or
   determining that the type of problem is a code problem based on a determination that the identified simulated requests do not include multiple types of requests above the threshold number of types of requests.

8. A system of comprising:
   at least one hardware processor; and
   a non-transitory computer-readable medium storing executable instructions that, when executed, cause the at least one processor to perform operations comprising:
      during a first period of time, repeatedly transmitting simulated requests to a networked system on which a software application is implemented using a plurality of nodes, the networked system being configured to respond to the simulated requests using the plurality of nodes;
      during the first period of time, terminating and restarting one or more nodes randomly selected until each one of the plurality of nodes in the plurality of nodes has been terminated and restarted at least once during the first period of time;
      for each one of the simulated requests transmitted during the first period of time, determining a corresponding response time of the networked system in responding to the simulated request, the corresponding response time comprising an amount of time between a first time at which the simulated request was transmitted to the networked system and a second time at which the networked system responded to the simulated request;
      storing the corresponding response times for the simulated requests in a database; and
      performing a function using at least a portion of the corresponding response times for the simulated requests, the function comprising:
         identifying the simulated requests for which the corresponding response times are above a threshold response time;
         determining whether the identified simulated requests include multiple types of requests above a threshold number of types of requests;
         determining a type of problem affecting the networked system based on the determining of whether the identified simulated requests include multiple types of requests above the threshold number of types of requests;
         generating a recommendation for modifying the networked system based on the determining of the type of problem affecting the networked system; and
         causing the generated recommendation to be displayed on a computing device.

9. The system of claim 8, wherein the software application is implemented on a microservices architecture of the networked system.

10. The system of claim 8, wherein for each random selection of one or more nodes during the first period of time, a total number of the one or more nodes is less than a total number of the plurality of nodes.

11. The system of claim 8, wherein the operations further comprise:
   during a second period of time after the first period of time, repeatedly transmitting additional simulated requests to the networked system, the networked system being configured to respond to the additional simulated requests using the plurality of nodes;
   during the second period of time, terminating and restarting one or more nodes randomly selected until each one of the plurality of nodes in the plurality of nodes has been terminated and restarted at least once during the second period of time;
   for each one of the additional simulated requests transmitted during the second period of time, determining a corresponding response time of the networked system in responding to the additional simulated request; and
   storing the corresponding response times for the additional simulated requests in the database,
   wherein for each random selection of one or more nodes during the first period of time, a total number of the one or more nodes randomly selected is a first number,
   wherein for each random selection of one or more nodes during the second period of time, a total number of the one or more nodes randomly selected is a second number that is greater than the first number, and
   wherein the function is performed using the corresponding response times for the simulated requests transmitted during the first period of time and the corresponding response times for the additional simulated requests transmitted during the second period of time.

12. The system of claim 8, wherein the function further comprises causing the at least a portion of the corresponding response times for the simulated requests to be displayed on a computing device.

13. The system of claim 8, wherein the determining of the type of problem comprises determining whether the type of problem is a capacity problem or a code problem.

14. The system of claim 13, wherein the determining whether the type of problem is a capacity problem or a code problem comprises:
   determining that the type of problem is a capacity problem based on a determination that the identified simulated requests include multiple types of requests above the threshold number of types of requests; or
   determining that the type of problem is a code problem based on a determination that the identified simulated requests do not include multiple types of requests above the threshold number of types of requests.

15. A non-transitory machine-readable storage medium tangibly embodying a set of instructions that, when executed by at least one hardware processor, causes the at least one processor to perform operations comprising:
   during a first period of time, repeatedly transmitting simulated requests to a networked system on which a software application is implemented using a plurality of nodes, the networked system being configured to respond to the simulated requests using the plurality of nodes;
   during the first period of time, terminating and restarting one or more nodes randomly selected until each one of the plurality of nodes in the plurality of nodes has been terminated and restarted at least once during the first period of time;

for each one of the simulated requests transmitted during the first period of time, determining a corresponding response time of the networked system in responding to the simulated request, the corresponding response time comprising an amount of time between a first time at which the simulated request was transmitted to the networked system and a second time at which the networked system responded to the simulated request;

storing the corresponding response times for the simulated requests in a database; and performing a function using at least a portion of the corresponding response times for the simulated requests, the function comprising:

identifying the simulated requests for which the corresponding response times are above a threshold response time;

determining whether the identified simulated requests include multiple types of requests above a threshold number of types of requests;

determining a type of problem affecting the networked system based on the determining of whether the identified simulated requests include multiple types of requests above the threshold number of types of requests;

generating a recommendation for modifying the networked system based on the determining of the type of problem affecting the networked system; and causing the generated recommendation to be displayed on a computing device.

16. The non-transitory machine-readable storage medium of claim 15, wherein the software application is implemented on a microservices architecture of the networked system.

17. The non-transitory machine-readable storage medium of claim 15, wherein for each random selection of one or more nodes during the first period of time, a total number of the one or more nodes is less than a total number of the plurality of nodes.

18. The non-transitory machine-readable storage medium of claim 15, wherein the function further comprises causing the at least a portion of the corresponding response times for the simulated requests to be displayed on a computing device.

19. The non-transitory machine-readable storage medium of claim 15, wherein the determining of the type of problem comprises determining whether the type of problem is a capacity problem or a code problem.

20. The non-transitory machine-readable storage medium of claim 19, wherein the determining whether the type of problem is a capacity problem or a code problem comprises:

determining that the type of problem is a capacity problem based on a determination that the identified simulated requests include multiple types of requests above the threshold number of types of requests; or determining that the type of problem is a code problem based on a determination that the identified simulated requests do not include multiple types of requests above the threshold number of types of requests.

* * * * *